United States Patent
Kunii et al.

(10) Patent No.: US 11,549,002 B2
(45) Date of Patent: Jan. 10, 2023

(54) RUBBER COMPOSITION AND RUBBER MOLDED PRODUCT

(71) Applicant: UCHIYAMA MANUFACTURING CORP., Okayama (JP)

(72) Inventors: Taiga Kunii, Okayama (JP); Kazushi Sakate, Okayama (JP)

(73) Assignee: UCHIYAMA MANUFACTURING CORP., Okayama (JP)

( * ) Notice: Subject to any disclaimer, the term of this patent is extended or adjusted under 35 U.S.C. 154(b) by 348 days.

(21) Appl. No.: 16/830,424

(22) Filed: Mar. 26, 2020

(65) Prior Publication Data
US 2020/0308373 A1 Oct. 1, 2020

(30) Foreign Application Priority Data
Mar. 28, 2019 (JP) .............................. JP2019-062488

(51) Int. Cl.
| | | |
|---|---|---|
| *C08L 9/02* | (2006.01) | |
| *C08L 91/06* | (2006.01) | |
| *C08K 3/04* | (2006.01) | |
| *C08K 3/34* | (2006.01) | |
| *C08K 5/39* | (2006.01) | |
| *C08K 3/36* | (2006.01) | |

(52) U.S. Cl.
CPC ........ *C08L 9/02* (2013.01); *C08K 3/04* (2013.01); *C08K 3/346* (2013.01); *C08K 3/36* (2013.01); *C08K 5/39* (2013.01); *C08L 91/06* (2013.01); *C08L 2312/00* (2013.01)

(58) Field of Classification Search
CPC ........ C08L 9/02; C08L 91/06; C08L 2312/00; C08K 3/04; C08K 3/346; C08K 365/39
See application file for complete search history.

(56) References Cited

U.S. PATENT DOCUMENTS

| | | | |
|---|---|---|---|
| 6,592,264 B2 * | 7/2003 | Yabe | B60B 27/00 384/484 |
| 2010/0143630 A1 * | 6/2010 | Gong | C08K 5/0091 524/174 |
| 2018/0134831 A1 * | 5/2018 | Shiono | C08L 15/005 |

FOREIGN PATENT DOCUMENTS

| | | | |
|---|---|---|---|
| JP | 52-130838 A | 11/1977 | |
| JP | 11-80426 A | 3/1999 | |
| JP | 2003-268158 A | 9/2003 | |
| JP | 2015-98505 A | 5/2015 | |
| WO | WO-2019124462 A1 * | 6/2019 | ............... C08K 3/04 |

* cited by examiner

*Primary Examiner* — James C Goloboy

(74) *Attorney, Agent, or Firm* — Rankin, Hill & Clark LLP

(57) ABSTRACT

A rubber composition includes: 100 parts by mass of a nitrile rubber (A); 10 to 300 parts by mass of a white filler (B); 0.3 to 10 parts by mass of a paraffin wax (C); and 0.5 to 5 parts by mass of a dithiocarbamic acid salt-based antioxidant (D). The nitrile rubber (A) has a content of an acrylonitrile unit of 19 to 30 mass %, and the paraffin wax (C) has a melting point of 45 to 100° C.

15 Claims, No Drawings

RUBBER COMPOSITION AND RUBBER MOLDED PRODUCT

CROSS-REFERENCE TO RELATED APPLICATION

This application claims priority from Japanese Patent Application No. 2019-062488 filed with the Japan Patent Office on Mar. 28, 2019, the entire content of which is hereby incorporated by reference.

BACKGROUND

1. Technical Field

An aspect of the present disclosure relates to a rubber composition, and a rubber molded product obtained by crosslinking the rubber composition.

2. Related Art

A rubber molded product obtained by vulcanizing a nitrile rubber composition is used in a broad range of applications. In particular, such a rubber molded product is suitably used in automobile components such as a gasket for sealing fluid and a seal of a bearing used for axles.

The nitrile rubber composition appropriately contains various additives such as paraffin, silica, and dithiocarbamic acid salt, depending on the intended use of a molded product after vulcanization. For example, JP-A-11-80426 describes a rubber composition that contains silica and chlorinated paraffin as additives, and JP-A-2003-268158 describes a rubber composition that contains copper dialkyldithiocarbamate and paraffin oil. Also, JP-A-52-130838 describes a rubber composition that contains sodium silicate and wax as additives. Furthermore, JP-A-2015-98505 describes a rubber composition that contains, as an additive, dry silica whose surface has been lipophilic treated.

It is noted that one of the causes of the deterioration of a rubber molded product includes oxidation deterioration due to ozone present in air. In particular, a rubber molded product used in automobile components is often used in a location where it is exposed to outside air, and is thus susceptible to ozone. Therefore, it is preferable that such a rubber molded product have excellent ozone resistance. Moreover, performance necessary for automobile components has been becoming tough in recent years. Accordingly, a rubber molded product having further excellent ozone resistance is demanded.

SUMMARY

A rubber composition includes: 100 parts by mass of a nitrile rubber (A); 10 to 300 parts by mass of a white filler (B); 0.3 to 10 parts by mass of a paraffin wax (C); and 0.5 to 5 parts by mass of a dithiocarbamic acid salt-based antioxidant (D). The nitrile rubber (A) has a content of an acrylonitrile unit of 19 to 30 mass %, and the paraffin wax (C) has a melting point of 45 to 100° C.

DETAILED DESCRIPTION

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

An object of the present disclosure is to provide a rubber molded product having excellent ozone resistance.

A rubber composition according to an aspect of the present disclosure includes: 100 parts by mass of a nitrile rubber (A); 10 to 300 parts by mass of a white filler (B); 0.3 to 10 parts by mass of a paraffin wax (C); and 0.5 to 5 parts by mass of a dithiocarbamic acid salt-based antioxidant (D). The nitrile rubber (A) has a content of an acrylonitrile unit of 19 to 30 mass %, and the paraffin wax (C) has a melting point of 45 to 100° C.

At this time, the rubber composition preferably further includes 0.2 to 5 parts by mass of a microcrystalline wax-based antioxidant (E). Also, the rubber composition preferably further includes 1 to 30 parts by mass of a plasticizer (F) having a heating loss rate, after having been left to stand at 150° C. for 24 hours, of 5 mass % or less.

Moreover, the nitrile rubber (A) preferably has a content of an acrylonitrile unit of 24 to 29 mass %. Also, the rubber composition preferably has a content of a carbon black (G) of less than 10 parts by mass.

The rubber composition preferably contains, as the white filler (B), at least one selected from the group consisting of silica (B1), calcined kaolin (B2), diatomaceous earth (B3), and wollastonite (B4).

A rubber molded product obtained by vulcanizing the above-described rubber composition is a suitable aspect of the present disclosure. Also, a seal or a gasket each containing the above-described rubber molded product is a particularly suitable aspect of the present disclosure.

According to the above-described aspect of the present disclosure, a rubber molded product having excellent ozone resistance can be provided. Also, a rubber composition for obtaining such a rubber molded product can be provided.

A rubber composition according to one embodiment of the present disclosure includes: 100 parts by mass of a nitrile rubber (A); 10 to 300 parts by mass of a white filler (B); 0.3 to 10 parts by mass of a paraffin wax (C); and 0.5 to 5 parts by mass of a dithiocarbamic acid salt-based antioxidant (D). The nitrile rubber (A) has a content of an acrylonitrile unit of 19 to 30 mass %, and the paraffin wax (C) has a melting point of 45 to 100° C.

[Nitrile Rubber (A)]

An example of the nitrile rubber (A) used in the present embodiment may include a copolymer of acrylonitrile and 1,3-butadiene. Hydrogenation of a double bond remaining in a 1,3-butadiene unit after polymerization is optional. Non-hydrogenated nitrile rubber and hydrogenated nitrile rubber can be appropriately used in different ways.

In the present embodiment, the content of an acrylonitrile unit in the nitrile rubber (A) is 19 to 30 mass %. From the viewpoint of a balance between heat resistance and low temperature resistance, it is important that the content of an acrylonitrile unit is within the above-described range. The content of an acrylonitrile unit is preferably 24 mass % or more. On the other hand, the content of an acrylonitrile unit is preferably 29 mass % or less. The content of a 1,3-butadiene unit, including a hydrogenated one, constitutes all or a large portion of the remainder.

The nitrile rubber (A) used in the present embodiment may include a constitutional unit derived from another copolymerizable monomer, within a range that does not inhibit the effects of the present embodiment. For example, the nitrile rubber (A) may include a functional group such as a carboxyl group and a carboxylic acid anhydride group. The copolymerization amount of such another monomer is usually 10 mol % or less, preferably 5 mol % or less, more preferably 2 mol % or less.

The Mooney viscosity ($ML_{1+4}$, 100° C.) of the nitrile rubber (A) is preferably 10 to 150. From the viewpoint of the molding properties of the rubber composition, the Mooney viscosity is preferably 10 or more, more preferably 20 or more. On the other hand, from the viewpoint of the strength of the rubber molded product, the Mooney viscosity is preferably 120 or less, more preferably 110 or less.

The nitrile rubber (A) to be used may be one nitrile rubber or a mixture of two or more nitrile rubbers. Here, when two or more nitrile rubbers are mixed, the content of an acrylonitrile unit and the Mooney viscosity in the mixture of the nitrile rubbers are each an average value calculated in consideration of the formulation ratio of the nitrile rubbers.

[White Filler (B)]

The rubber composition according to the present embodiment includes a white filler (B). The content of the white filler (B) is 10 to 300 parts by mass with respect to 100 parts by mass of the nitrile rubber (A). When the content of the white filler (B) is less than 10 parts by mass, it is difficult to obtain a rubber molded product having excellent ozone resistance. The content of the white filler (B) is preferably 30 parts by mass or more, more preferably 50 parts by mass or more. From the viewpoint of also improving the heat resistance of the rubber molded product, the content of the white filler (B) is further preferably 90 parts by mass or more. On the other hand, when the content of the white filler (B) is more than 300 parts by mass, the stretch of the rubber molded product may decrease. The content of the white filler (B) is preferably 250 parts by mass or less, more preferably 200 parts by mass or less, further preferably 150 parts by mass or less.

The type of the white filler (B) is not particularly limited. An example of the white filler (B) may include a white inorganic compound which is generally formulated in a rubber composition. In particular, the inorganic compound is preferably at least one selected from the group consisting of an oxide of metal or silicon, carbonate salt, and a composite thereof. This inorganic compound is more preferably at least one selected from the group consisting of an oxide of metal or silicon, and a composite thereof. Here, examples of the composite may include a mixture of an oxide of metal and an oxide of silicon, and a composite oxide containing a metal atom and a silicon atom which are bonded via oxygen.

Examples of an oxide of metal may include aluminum oxide (alumina) and titanium oxide (titania). An example of an oxide of silicon may include silica. An example of carbonate salt may include calcium carbonate. Examples of the above-described composite may include kaolin, calcined kaolin, diatomaceous earth, wollastonite, and talc. The white filler (B) is preferably at least one selected from the group consisting of silica (B1), calcined kaolin (B2), diatomaceous earth (B3), and wollastonite (B4).

Here, the silica (B1) indicates a white filler (sometimes also referred to as white carbon) that primarily contains silicon dioxide. Kaolin is a naturally occurring clay mineral that primarily contains wet aluminum silicate (composition formula: $Al_2Si_2O_5(OH)_4$). The calcined kaolin (B2) is a compound obtained by purifying this clay mineral and thereafter calcining the purified clay mineral at high temperature to remove crystal water. The diatomaceous earth (B3) is a deposit that contains fossilized shells of diatoms, a type of monocellular algae. The diatomaceous earth (B3) primarily contains silicon dioxide (composition formula: $SiO_2$). The wollastonite (B4) (composition formula: $CaO \cdot SiO_2$) is naturally occurring calcium metasilicate. The silica (B1) is an artificial synthetic material. Therefore, the silica (B1) can be selected from various silicas having different particle diameters, specific gravities, and/or the like, depending on its intended use. The silica (B1) is suitably used as one of the white filler (B).

In the present embodiment, from the viewpoint of improving ozone resistance, the rubber composition preferably includes, as the white filler (B), at least the silica (B1). At this time, the content of the silica (B1) with respect to 100 parts by mass of the nitrile rubber (A) is preferably 20 parts by mass or more, more preferably 40 parts by mass or more. On the other hand, from the viewpoint of suppressing the decrease in stretch of the rubber molded product, the content of the silica (B1) with respect to 100 parts by mass of the nitrile rubber (A) is preferably 200 parts by mass or less, more preferably 150 parts by mass or less, further preferably 100 parts by mass or less.

Also, in the present embodiment, from the viewpoint of improving heat resistance, the rubber composition includes, in addition to the silica (B1), suitably at least any one of, further suitably both of, the calcined kaolin (B2) and the diatomaceous earth (B3) as the white filler (B).

At this time, the content of the calcined kaolin (B2) with respect to 100 parts by mass of the nitrile rubber (A) is preferably 10 parts by mass or more, more preferably 20 parts by mass or more. On the other hand, the content of the calcined kaolin (B2) with respect to 100 parts by mass of the nitrile rubber (A) is preferably 100 parts by mass or less, more preferably 75 parts by mass or less, further preferably 50 parts by mass or less.

Also, the content of the diatomaceous earth (B3) with respect to 100 parts by mass of the nitrile rubber (A) is preferably 10 parts by mass or more, more preferably 20 parts by mass or more. On the other hand, the content of the diatomaceous earth (B3) with respect to 100 parts by mass of the nitrile rubber (A) is preferably 100 parts by mass or less, more preferably 75 parts by mass or less, further preferably 50 parts by mass or less.

Here, a white filler generally formulated in a rubber composition is often hydrophilic. Therefore, when the paraffin wax (C) is formulated together with such a white filler in the rubber composition, the paraffin wax (C) is likely to bloom on the surface of the rubber molded product. This improves the ozone resistance of the rubber molded product. From such a viewpoint, it is important in the present embodiment that the rubber composition includes both a predetermined amount of the white filler (B) and a predetermined amount of the paraffin wax (C). It is noted that another example of the white filler (B) formulated in the rubber composition may include a white filler whose surface has been treated with a coupling agent such as alkoxysilane to become lipophilic. A small amount of such a lipophilic white filler may be included in the rubber composition according to the present embodiment. However, from the above-described viewpoint, the content of this lipophilic white filler with respect to 100 parts by mass of the nitrile rubber (A) is preferably 10 parts by mass or less.

[Paraffin Wax (C)]

The rubber composition according to the present embodiment includes a paraffin wax (C). Here, the paraffin wax (C) primarily includes linear hydrocarbon (normal paraffin). The paraffin wax (C) can be obtained by separating and extracting highly crystallizable hydrocarbon from oil content of crude oil distilled under reduced pressure. Also, the paraffin wax (C) is usually formulated in the rubber composition during the manufacture of the rubber molded product for a purpose of improving kneading properties and mold release properties. As described later, the paraffin wax (C) and the microcrystalline wax-based antioxidant (E) are clearly distinguished from each other by those skilled in the art.

The content of the paraffin wax (C) is 0.3 to 10 parts by mass with respect to 100 parts by mass of the nitrile rubber (A). When the content of the paraffin wax (C) is less than 0.3 parts by mass, it is difficult to obtain a rubber molded product having excellent ozone resistance. The content of the paraffin wax (C) is preferably 0.7 part by mass or more. On the other hand, when the content of the paraffin wax (C) is more than 10 parts by mass, the oil resistance of the rubber molded product may decrease (the volume change may increase). The content of the paraffin wax (C) is preferably 8 parts by mass or less, more preferably 5 parts by mass or less, further preferably 3 parts by mass or less.

The melting point of the paraffin wax (C) used in the present embodiment is 45 to 100° C. The paraffin wax (C) having such a melting point blooms on the surface of the rubber molded product, and then easily solidifies thereon to become a protective coat. Therefore, when the paraffin wax (C) is formulated in the rubber composition, there can be obtained a rubber molded product having excellent ozone resistance. Also, the paraffin wax (C), which is solid at room temperature, has better handleability than paraffin oil.

When the melting point of the paraffin wax (C) is lower than 45° C., the endurance of the protective coat formed on the surface of the rubber molded product decreases. The melting point of the paraffin wax (C) is more preferably 48° C. or higher, further preferably 50° C. or higher. On the other hand, when the melting point of the paraffin wax (C) is higher than 100° C., the paraffin wax (C) blooming on the surface of the rubber molded product does not easily solidify, with the result that the formation of the protective coat may take time. Therefore, the melting point of the paraffin wax (C) is more preferably 90° C. or lower, further preferably 80° C. or lower.

Also, the average molecular weight of the paraffin wax (C) used in the present embodiment is preferably 320 to 500. When the average molecular weight of the paraffin wax (C) is less than 320, the endurance of the protective coat formed on the surface of the rubber molded product may decrease. Therefore, the average molecular weight of the paraffin wax (C) is more preferably 340 or more. On the other hand, when the average molecular weight of the paraffin wax (C) is more than 500, the paraffin wax (C) blooming on the surface of the rubber molded product does not easily solidify, with the result that the formation of the protective coat may take time. Therefore, the average molecular weight of the paraffin wax (C) is more preferably 460 or less.

[Dithiocarbamic Acid Salt-Based Antioxidant (D)]

The rubber composition according to the present embodiment includes a dithiocarbamic acid salt-based antioxidant (D). The type of the dithiocarbamic acid salt-based antioxidant (D) is not particularly limited. Examples of an anion species in dithiocarbamic acid salt may include a dimethyldithiocarbamic acid ion, diethyldithiocarbamic acid ion, and dibutyldithiocarbamic acid ion. Also, examples of a cationic species may include nickel, zinc, iron, copper, and tellurium.

The content of the dithiocarbamic acid salt-based antioxidant (D) is 0.5 to 5 parts by mass with respect to 100 parts by mass of the nitrile rubber (A). When the content of the dithiocarbamic acid salt-based antioxidant (D) is less than 0.5 part by mass, it is difficult to obtain a rubber molded product having excellent ozone resistance. The content of the dithiocarbamic acid salt-based antioxidant (D) is preferably 0.7 part by mass or more. On the other hand, when the content of the dithiocarbamic acid salt-based antioxidant (D) is more than 5 parts by mass, failure of dispersion may cause the stretch of the rubber molded product to decrease. The content of the dithiocarbamic acid salt-based antioxidant (D) is preferably 3 parts by mass or less.

[Microcrystalline Wax-Based Antioxidant (E)]

The rubber composition according to the present embodiment preferably further includes a microcrystalline wax-based antioxidant (E). Here, the microcrystalline wax-based antioxidant (E) mainly indicates wax removed from residue oil content of crude oil distilled under reduced pressure. The microcrystalline wax-based antioxidant (E) contains more branched hydrocarbons (isoparaffins) and more saturated cyclic hydrocarbons (cycloparaffins) than the above-described paraffin wax (C).

The content of the microcrystalline wax-based antioxidant (E) is preferably 0.2 to 5 parts by mass with respect to 100 parts by mass of the nitrile rubber (A). When the content of the microcrystalline wax-based antioxidant (E) is less than 0.2 part by mass, the rubber molded product may have insufficient ozone resistance. The content of the microcrystalline wax-based antioxidant (E) is more preferably 0.5 part by mass or more, further preferably 0.8 part by mass or more. On the other hand, when the content of the microcrystalline wax-based antioxidant (E) is more than 5 parts by mass, the oil resistance of the rubber molded product may decrease (the volume change may increase toward the minus side). The content of the antioxidant (E) is more preferably 3 parts by mass or less.

The rubber composition according to the present embodiment may include an antioxidant other than the dithiocarbamic acid salt-based antioxidant (D) and the microcrystalline wax-based antioxidant (E). Examples of such an antioxidant may include antioxidants based on naphthylamine, diphenylamine, p-phenylenediamine, quinoline, hydroquinone, phenol, and ions.

[Plasticizer (F)]

The rubber composition according to the present embodiment preferably includes a plasticizer (F). More preferably, the heating loss rate of the plasticizer (F) after having been left to stand at 150° C. for 24 hours is 5 mass % or less. When the heating loss rate is more than 5 mass %, heating may cause the increase in hardness of the rubber molded product, resulting in the reduction of the heat resistance of the rubber molded product. The heating loss rate is more preferably 4 mass % or less, further preferably 3 mass % or less, particularly preferably 2.5 mass % or less. As described herein, the heating loss rate is a value expressed by percentage which is obtained as follows. That is, when the rubber composition is heated under a predetermined condition, the mass of the rubber composition after heating is subtracted from the mass of the rubber composition before heating, and the resultant value is divided by the mass of the rubber composition before heating. Details of a measurement method of the heating loss rate are as described in the following Examples.

The type of the plasticizer (F) used in the present embodiment is not particularly limited, as long as the plasticizer (F) has a heating loss rate within the above-described range. As the plasticizer (F), a plasticizer generally mixed in a rubber composition is used. Examples of the plasticizer (F) may include phthalic acid derivatives, tetrahydrophthalic acid derivatives, adipic acid derivatives, azelaic acid derivatives, sebacic acid derivatives, dodecane-2-acid derivatives, maleic acid derivatives, fumaric acid derivatives, trimellitic acid derivatives, pyromellitic acid derivatives, citric acid derivatives, oleic acid derivatives, ricinoleic acid derivatives, stearic acid derivatives, sulfonic acid derivatives, phosphoric acid derivatives, glutaric acid derivatives, glycol derivatives, glycerin derivatives, paraffin derivatives, epoxy derivatives, and polymerized plasticizers (such as polyester and polyether). One of these plasticizers may be used singly, or two or more may be used in combination.

The content of the plasticizer (F) is not particularly limited. However, the content of the plasticizer (F) is preferably 1 to 30 parts by mass with respect to 100 parts by mass of the nitrile rubber (A). When the content of the plasticizer (F) is less than 1 part by mass, the stretch of the rubber molded product may decrease. The content of the plasticizer (F) is preferably 2 parts by mass or more, more preferably 5 parts by mass or more. On the other hand, when the content of the plasticizer (F) is more than 30 parts by mass, the oil resistance of the rubber molded product may decrease. The content of the plasticizer (F) is more preferably 20 parts by mass or less, further preferably 18 parts by mass or less, particularly preferably 13 parts by mass or less.

[Carbon Black (G)]

The content of the carbon black (G) in the rubber composition according to the present embodiment is preferably less than 10 parts by mass with respect to 100 parts by mass of the nitrile rubber (A). As the content of the carbon black (G) increases, the color of the rubber molded product becomes black. The rubber molded product containing a small amount of the carbon black (G) can be colored into various hues, and thus has a high commercial value. Therefore, the content of the carbon black (G) is preferably small. From such a viewpoint, the content of the carbon black (G) is more preferably less than 5 parts by mass, further preferably less than 2 parts by mass, particularly preferably less than 1 part by mass, most preferably substantially 0.

The type of the carbon black (G) is not particularly limited. Examples of the carbon black (G) to be used may include SAF, ISAF, HAF, FEF, GPF, MAF, SRF, FT, and MT.

A method for manufacturing the rubber molded product according to the present embodiment is not particularly limited. A suitable method includes: a kneading process of kneading a nitrile rubber (A), a white filler (B), a paraffin wax (C), a dithiocarbamic acid salt-based antioxidant (D), and a curing agent to obtain a rubber composition; a molding process of molding the rubber composition; and a vulcanizing process of vulcanizing the rubber composition.

In the kneading process, a method for mixing the above-described components is not particularly limited. The above-described components can be kneaded using an open roll, a kneader, a Banbury mixer, an intermixer, an extruder, or the like. Among these, the Banbury mixer, intermixer, or kneader is preferably used to knead the above-described components. The temperature during kneading is preferably set at 20 to 140° C.

The rubber composition obtained in this manner is molded in the molding process, and subsequently vulcanized in the vulcanizing process, to thereby obtain the rubber molded product according to the present embodiment.

Examples of a method for molding the rubber composition may include injection molding, extrusion molding, compression molding, and roll molding. Among these, injection molding and compression molding are suitable. At this time, the rubber composition may be previously molded and then vulcanized, or may be subjected to molding and vulcanization simultaneously. It is preferable that the vulcanization temperature be usually 150 to 230° C. The vulcanization time is usually 0.1 to 60 minutes. A heating method for vulcanizing the rubber composition may include a general method used for the vulcanization of rubber, such as compression heating, steam heating, oven heating, and hot air heating.

Also, even if the surface of the rubber molded product has been vulcanized, the inside may not be sufficiently vulcanized depending on the shape and dimension of the rubber molded product. Therefore, secondary vulcanization by further heating may be performed.

A method for vulcanization is not particularly limited, and may include, for example, sulfur vulcanization and peroxide vulcanization. As a curing agent during sulfur vulcanization, sulfur or a sulfur containing compound is used. Also, as a curing agent during peroxide vulcanization, organic peroxide is used. The amount of the curing agent used at this time is usually 0.1 to 10 parts by mass with respect to 100 parts by mass of the nitrile rubber (A).

As described above, according to the present embodiment, a rubber molded product having excellent ozone resistance can be obtained. Therefore, taking advantage of such a characteristic, the rubber molded product according to the present embodiment is suitably used in a seal and a gasket which are mounted to automobiles. Examples of the seal may include a bearing seal, oil seal, and shaft seal. Examples of the gasket may include a gasket for cylinder head covers and a gasket for oil pans.

EXAMPLES

Raw materials used in the following Examples are as follows.

Nitrile Rubber (A1)
"N241" manufactured by JSR Corporation (content of acrylonitrile unit: 29%, Mooney viscosity ($ML_{1+4}$, 100° C.): 56)

Nitrile Rubber (A2)
"Nipol DN2850" manufactured by Zeon Corporation (content of acrylonitrile unit: 28%, Mooney viscosity ($ML_{1+4}$, 100° C.): 50)

Nitrile Rubber (A3)
"N240S" manufactured by JSR Corporation (content of acrylonitrile unit: 26%, Mooney viscosity ($ML_{1+4}$, 100° C.): 56)

Silica (B1)
Trade name "Nipsil ER" manufactured by Tosoh Silica Corporation

Calcined Kaolin (B2)
Trade name "Satintone No. 5" manufactured by Takehara Kagaku Kogyo Co., Ltd.

Diatomaceous Earth (B3)
Trade name "Radiolite F" manufactured by Showa Chemical Industry Co., Ltd.

Paraffin Wax (C)
Product name "Paraffin Wax 135" manufactured by Nippon Seiro Co., Ltd. (melting point: 58° C., oil content: 0.3 mass %, penetration: 13 (25° C.), 21 (35° C.), viscosity: 3.9 $mm^2/s/100°$ C., Saybolt color: +30, density: 0.911 $g/cm^3$ (25° C.), 0.775 $g/cm^3$ (70° C.), flash point: 234° C., average molecular weight: 389 (gas chromatography))

Dithiocarbamic Acid Salt-Based Antioxidant (D)
Nickel dibutyldithiocarbamate (trade name "Nocrac NBC" manufactured by Ouchi Shinko Chemical Industrial Co., Ltd.)

Microcrystalline Wax-Based Antioxidant (E)
Microcrystalline wax "Sunnoc" manufactured by Ouchi Shinko Chemical Industrial Co., Ltd.

Plasticizer (F)
Trimellitic acid ester-based plasticizer "ADK Cizer C-9N" manufactured by Adeka Corporation The heating loss rate of the plasticizer (F) was 2 mass %. Here, the heating loss rate is a value expressed by percentage which is obtained as follows. That is, when the rubber composition obtained in the following "Preparation of rubber sheet" is placed in an oven at 150° C. and left to stand for 24 hours, the mass of the rubber composition after heating is subtracted from the mass of the rubber composition before heating, and the resultant value is divided by the mass of the rubber composition before heating.
Antioxidant
Alkyl diphenyl amine (trade name "Nocrac ODA" manufactured by Ouchi Shinko Chemical Industrial Co., Ltd.)
Coupling Agent
KBM802 manufactured by Shin-Etsu Chemical Co., Ltd.
Vulcanization Promoter (DM)
"Nocceler DM-P" (chemical name: di-2-benzothiazolyl disulfide) manufactured by Ouchi Shinko Chemical Industrial Co., Ltd.
Vulcanization Promoter (TT)
"Nocceler TT-P" (chemical name: tetramethylthiuram disulfide) manufactured by Ouchi Shinko Chemical Industrial Co., Ltd.

Example 1

(Preparation of Rubber Sheet)

A mixture having a make-up indicated below was kneaded using an open roll at a temperature of 20 to 100° C. for 10 to 30 minutes, to thereby obtain a rubber composition. With this rubber composition, an unvulcanized rubber sheet having a thickness of 2 mm was prepared (hereinafter, this rubber sheet is sometimes simply referred to as an unvulcanized rubber sheet).
Nitrile rubber (A1): 50 parts by mass
Nitrile rubber (A2): 50 parts by mass
Silica (B1): 50 parts by mass
Calcined kaolin (B2): 25 parts by mass
Diatomaceous earth (B3): 25 parts by mass
Paraffin wax (C): 1 part by mass
Dithiocarbamic acid salt-based antioxidant (D): 2 parts by mass
Microcrystalline wax-based antioxidant (E): 1 part by mass
Plasticizer (F): 10 parts by mass
Antioxidant: 1 part by mass
Coupling agent: 1 part by mass
Active zinc oxide: 5 parts by mass
Stearic acid: 1 part by mass
Sulfur: 1.5 parts by mass
Vulcanization promoter (DM): 1 part by mass
Promoter (TT): 1 part by mass
[Evaluation]
(Vulcanization Properties)

The obtained unvulcanized rubber sheet as a sample was measured in accordance with JIS K6300-2, using a "Curelastometer 7" manufactured by JSR Trading Co., Ltd. A vulcanization curve at a measurement temperature of 180° C. for 5 minutes was measured to prepare a graph with torque on the vertical axis and time on the horizontal axis. From this graph, there were calculated minimum torque value ML (kgf·cm), maximum torque value MH (kgf·cm), time T10 (min) until a torque reaches 10% of MH, and time T90 (min) until a torque reaches 90% of MH. As a result, T10 was 0.7 minute, T90 1.2 minutes, ML 3.9 kgf·cm, and MH 46.7 kgf·cm.
(Original State Physical Properties)

The obtained unvulcanized rubber sheet was press-vulcanized at 170° C. for 10 minutes to thereby obtain a vulcanized rubber sheet having a thickness of 2 mm (hereinafter, this rubber sheet is sometimes simply referred to as a vulcanized rubber sheet). Three of these vulcanized rubber sheets were stacked to thereby obtain a measurement object. This measurement object was measured using a type A durometer at 23° C. under a relative humidity of 50% to read a peak value. As a result, the A hardness was 67. Also, the above-described vulcanized rubber sheet was measured for tensile strength (MPa) and stretch (%) at 23° C. under a relative humidity of 50% with a tension speed of 500 mm/min. As a result, the tensile strength was 13.1 MPa, and the stretch was 400%. The tensile test was performed in accordance with JIS K6251. The hardness was measured in accordance with JIS K6253.
(Heat Aging Test)

The above-described vulcanized rubber sheet was heated at 120° C. for 70 hours. After heating, three of these vulcanized rubber sheets were stacked to thereby obtain a measurement object. This measurement object was measured using a type A durometer at 23° C. under a relative humidity of 50% to read a peak value. Also, the above-described vulcanized rubber sheet after heating was measured for tensile strength (MPa) and stretch (%) at 23° C. under a relative humidity of 50% with a tension speed of 500 mm/min. The heat aging test was performed in accordance with JIS K6257.

Then, heat aging properties were evaluated by calculating a change of a value for the above-described original state physical properties. As a result, the hardness change was +5 points. This hardness change is a value obtained by subtracting the A hardness before heating from the A hardness after heating.

Also, the tensile strength change rate was +5%. This tensile strength change rate is a value expressed by percentage which is obtained by subtracting the value of the tensile strength before heating from the value of the tensile strength after heating, and dividing the resultant value by the value of the tensile strength before heating. A positive tensile strength change rate indicates that the tensile strength was increased by heating, and a negative tensile strength change rate indicates that the tensile strength was decreased by heating. The stretch change rate was calculated by the same calculation method to be −30%.
(Oil Resistance Test)

The above-described vulcanized rubber sheet was placed in oil, and heated at 120° C. for 70 hours. After heating, three of these vulcanized rubber sheets were stacked to thereby obtain a measurement object. This measurement object was measured using a type A durometer at 23° C. under a relative humidity of 50% to read a peak value. Also, the above-described vulcanized rubber sheet after heating was measured for tensile strength (MPa) and stretch (%) at 23° C. under a relative humidity of 50% with a tension speed of 500 mm/min. The heat aging test was performed in accordance with JIS K6258.
(Static Ozone Deterioration Test)

The above-described vulcanized rubber sheet was left to stand under an atmosphere indicated in each of the following measurement conditions 1 and 2. Thereafter, the surface of the vulcanized rubber sheet was observed. The result is indicated in Table 1. In Table 1, "present" is described for "presence or absence of cracks", when cracking occurred on the surface of the rubber sheet. On the other hand, "absent" is described for "presence or absence of cracks", when cracking did not occur on the surface of the rubber sheet. The static ozone deterioration test was performed in accordance with JIS K6259.

Measurement condition 1: static stretch rate 5%, temperature 23° C., humidity 10%, left to stand under atmosphere of an ozone concentration of 200 pphm for 48 hours Measurement condition 2: static stretch rate 5%, temperature 23° C., humidity 65%, left to stand under atmosphere of an ozone concentration of 200 pphm for 48 hours (Glass Transition Temperature)

The glass transition temperature (° C.) of the rubber molded product is illustrated in Table 1. The glass transition temperature (° C.) illustrated in Table 1 is a glass transition onset temperature measured at a temperature increasing rate of 10° C./min using a differential scanning calorimeter (DSC). The lower the glass transition temperature (° C.) is, the better the low temperature resistance of the rubber molded product is. Examples 2 to 6, and Comparative Examples 1 and 2

Rubber compositions were obtained by the same method as in Example 1, except that in the above-described "Preparation of vulcanized rubber sheet", the types and amounts of the components were changed as illustrated in Table 1. The obtained rubber compositions were evaluated in the same manner as in Example 1. The results are indicated in Table 1.

TABLE 1

| | | Example 1 | Example 2 | Example 3 | Example 4 | Example 5 | Example 6 | Comparative Example 1 | Comparative Example 2 |
|---|---|---|---|---|---|---|---|---|---|
| Make-up of rubber composition | | | | | | | | | |
| Nitrile rubber (A1) | | 50 | 50 | — | — | — | — | — | — |
| Nitrile rubber (A2) | | 50 | — | — | — | — | — | — | — |
| Nitrile rubber (A3) | | — | 50 | 100 | 100 | 100 | 100 | 100 | 100 |
| Silica (B1) | | 50 | 50 | 50 | 50 | 50 | 80 | 80 | 50 |
| Calcined kaolin (B2) | | 25 | 25 | 25 | 25 | 25 | — | — | 25 |
| Diatomaceous earth (B3) | | 25 | 25 | 25 | 25 | 25 | — | — | 25 |
| Paraffin wax (C) | | 1 | 1 | 1 | 1 | 1 | 1 | — | 1 |
| Dithiocarbamic acid salt-based antioxidant (D) | | 1 | 1 | 1 | 1 | 1 | 1 | 1 | — |
| Microcrystalline wax-based antioxidant (E) | | 1 | 1 | 1 | 1 | 1 | 1 | 1 | 1 |
| Plasticizer (F) | | 10 | 10 | 10 | 15 | 3 | 10 | 10 | 10 |
| Antioxidant | | 2 | 2 | 2 | 2 | 2 | 2 | 2 | 1 |
| Coupling agent | | 1 | 1 | 1 | 1 | 1 | 1 | 1 | 1 |
| Active zinc oxide | | 5 | 5 | 5 | 5 | 5 | 5 | 5 | 5 |
| Stearic acid | | 1 | 1 | 1 | 1 | 1 | 1 | 1 | 1 |
| Sulfur | | 1.5 | 1.5 | 1.5 | 1.5 | 1.5 | 1.5 | 1.5 | 1.5 |
| Vulcanization promoter (DM) | | 1 | 1 | 1 | 1 | 1 | 1 | 1 | 1 |
| Promoter (TT) | | 1 | 1 | 1 | 1 | 1 | 1 | 1 | 1 |
| Evaluation results | | | | | | | | | |
| Vulcanization properties | T10 (min) | 0.7 | 0.7 | 0.7 | 0.7 | 0.9 | 0.7 | 0.7 | 0.7 |
| | T90 (min) | 1.2 | 1.1 | 1.1 | 1.1 | 1.3 | 1.1 | 1.1 | 1.2 |
| | ML (kgf · cm) | 3.9 | 4.1 | 4.5 | 4.1 | 5.8 | 4.1 | 4.1 | 4.1 |
| | MH (kgf · cm) | 46.7 | 45.1 | 47.1 | 45.6 | 54.1 | 57.8 | 58.1 | 56.8 |
| Original state physical properties | Hardness (points) | 67 | 65 | 66 | 64 | 71 | 69 | 69 | 67 |
| | Tensile strength (MPa) | 13.1 | 12.9 | 13.1 | 12.5 | 14.1 | 12.8 | 12.5 | 12.9 |
| | Stretch (%) | 400 | 400 | 380 | 400 | 320 | 360 | 350 | 450 |
| Heat aging test | Hardness change (points) | +5 | +4 | +4 | +4 | +5 | +7 | +9 | +4 |
| | Tensile strength change rate (%) | +5 | +11 | +10 | +8 | +1 | +15 | +21 | +10 |
| | Stretch change rate (%) | −30 | −35 | −33 | −35 | −36 | −39 | −39 | −38 |
| Oil resistance test | Hardness change (points) | +5 | +6 | +6 | +7 | +3 | +5 | +4 | +6 |
| | Tensile strength change rate (%) | +8 | +7 | +8 | +15 | +1 | +15 | +5 | +10 |
| | Stretch change rate (%) | −10 | −8 | −8 | −18 | +5 | −39 | −15 | −11 |
| | Volume change rate (%) | −5 | −5 | −6 | −9 | −3 | −9 | −5 | −6 |
| Static ozone deterioration test (presence or absence of cracks) | Measurement condition 1 | Absent | Absent | Absent | Absent | Absent | Absent | Absent | Present |
| | Measurement condition 2 | Absent | Absent | Absent | Absent | Absent | Absent | Present | Present |
| Glass transition point (° C.) | | −39 | −39 | −39 | −39 | −42 | −41 | −38 | −41 |

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A rubber composition comprising:
   100 parts by mass of a nitrile rubber (A);
   80 to 300 parts by mass of a white filler (B);
   0.3 to 10 parts by mass of a paraffin wax (C); and
   0.5 to 5 parts by mass of a dithiocarbamic acid salt-based antioxidant (D), wherein
   the nitrile rubber (A) has a content of an acrylonitrile unit of 19 to 30 mass %,
   the paraffin wax (C) has a melting point of 45 to 100° C., and
   the rubber composition comprises, as the white filler (B), 40 parts by mass or more of silica (B1), 20 parts by mass or more of calcined kaolin (B2), and 20 parts by mass or more of diatomaceous earth (B3) with respect to 100 parts by mass of the nitrile rubber (A).

2. The rubber composition according to claim 1, further comprising 0.2 to 5 parts by mass of a microcrystalline wax-based antioxidant (E).

3. The rubber composition according to claim 1, further comprising 1 to 30 parts by mass of a plasticizer (F) having a heating loss rate, after having been left to stand at 150° C. for 24 hours, of 5 mass % or less.

4. The rubber composition according to claim 1, wherein the nitrile rubber (A) has a content of an acrylonitrile unit of 24 to 29 mass %.

5. The rubber composition according to claim 1, having a content of a carbon black (G) of less than 10 parts by mass.

6. A rubber molded product obtained by vulcanizing the rubber composition according to claim 1.

7. A seal or a gasket each containing the rubber molded product according to claim 6.

8. The rubber composition according to claim 2, further comprising 1 to 30 parts by mass of a plasticizer (F) having a heating loss rate, after having been left to stand at 150° C. for 24 hours, of 5 mass % or less.

9. The rubber composition according to claim 2, having a content of a carbon black (G) of less than 10 parts by mass.

10. The rubber composition according to claim 8, having a content of a carbon black (G) of less than 10 parts by mass.

11. The rubber composition according to claim 1, wherein the rubber composition comprises, as the white filler (B), 40 parts by mass or more and 100 parts by mass or less of the silica (B1), 20 parts by mass or more and 50 parts by mass or less of the calcined kaolin (B2), and 20 parts by mass or more and 50 parts by mass or less of the diatomaceous earth (B3) with respect to 100 parts by mass of the nitrile rubber (A).

12. The rubber composition according to claim 11, wherein the paraffin wax (C) has the melting point of 50 to 80° C.

13. The rubber composition according to claim 12, wherein an average molecular weight of the paraffin wax (C) is 340 to 460.

14. The rubber composition according to claim 10, wherein the content of the carbon black (G) is substantially 0.

15. The rubber composition according to claim 13, wherein the rubber composition has substantially 0 parts by mass of a carbon black (G).

* * * * *